(12) United States Patent
Ljung

(10) Patent No.: US 12,091,165 B2
(45) Date of Patent: Sep. 17, 2024

(54) ROTOR FLIGHT VEHICLE

(71) Applicant: ACC Innovation AB, Åtvidaberg (SE)

(72) Inventor: Anders Ljung, Mönsterås (SE)

(73) Assignee: ACC Innovation AB, Atvidaberg (SE)

( * ) Notice: Subject to any disclaimer, the term of this patent is extended or adjusted under 35 U.S.C. 154(b) by 1197 days.

(21) Appl. No.: 16/626,226

(22) PCT Filed: Jun. 26, 2017

(86) PCT No.: PCT/SE2017/050702
§ 371 (c)(1),
(2) Date: Dec. 23, 2019

(87) PCT Pub. No.: WO2019/004879
PCT Pub. Date: Jan. 3, 2019

(65) Prior Publication Data
US 2020/0115043 A1    Apr. 16, 2020

(51) Int. Cl.
*B64C 27/14* (2006.01)
*B64C 27/08* (2023.01)
(Continued)

(52) U.S. Cl.
CPC ............ *B64C 27/14* (2013.01); *B64C 27/08* (2013.01); *B64D 35/04* (2013.01); *F16H 7/02* (2013.01);
(Continued)

(58) Field of Classification Search
CPC .......... B64D 35/04; B64D 35/06; B64C 27/14
See application file for complete search history.

(56) References Cited

U.S. PATENT DOCUMENTS

| | | | | |
|---|---|---|---|---|
| 53,209 A | * | 3/1866 | Wilkison | F16H 7/02 280/137.5 |
| 148,353 A | * | 3/1874 | Curtis | F16H 7/02 474/63 |

(Continued)

FOREIGN PATENT DOCUMENTS

| | | |
|---|---|---|
| CN | 202848028 U | 4/2013 |
| CN | 103097243 A | 5/2013 |

(Continued)

OTHER PUBLICATIONS

Japan Patent Office. Office action for application 2019-568720, mailed on Mar. 9, 2021. With translation. 9 pages.

(Continued)

*Primary Examiner* — Nicholas McFall
*Assistant Examiner* — Marisa V Conlon
(74) *Attorney, Agent, or Firm* — Quarles & Brady LLP

(57) ABSTRACT

Rotor flight vehicle includes a first rotor, a power unit, a transmission from the power unit to the first rotor, wherein said transmission comprises at least one belt, a group of rotational axes, at least one power output axle connected to the power unit and at least one rotor axle connected to said first rotor, the belt is applied to the power output axle, the power output axle is concentric with a rotational axis, the belt transmits power to the rotor axle, the rotor axle is concentric with a rotational axis, wherein consecutive rotational axes of the group of rotational axes extend in a relation to each other such that the angle between them is in the range of 80-100 degrees, wherein the belt has a maximal torsion of 80-100 degrees, in the belt's transition between two respective consecutive rotational axes of the group of rotational axes.

20 Claims, 7 Drawing Sheets

Figure 1:
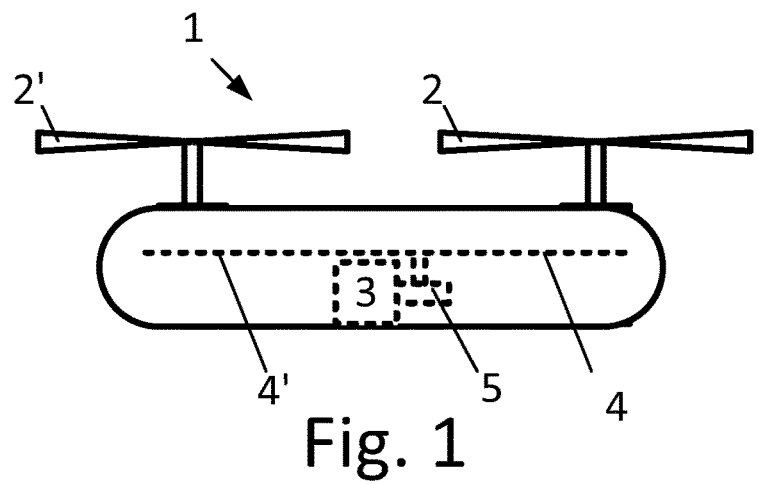

(51) Int. Cl.
  *B64D 35/04* (2006.01)
  *B64U 10/10* (2023.01)
  *B64U 30/20* (2023.01)
  *F16H 7/02* (2006.01)
  *B64C 39/02* (2023.01)

(52) U.S. Cl.
  CPC ............ *B64C 39/024* (2013.01); *B64U 10/10* (2023.01); *B64U 30/20* (2023.01)

(56) References Cited

U.S. PATENT DOCUMENTS

| | | | | |
|---|---|---|---|---|
| 150,655 | A * | 5/1874 | Dunfee | F16H 7/02 474/62 |
| 187,206 | A * | 2/1877 | Weber | F16H 7/02 474/63 |
| 1,006,734 | A * | 10/1911 | Dunn | B64D 27/00 244/66 |
| 2,058,161 | A * | 10/1936 | Lewis | B64C 23/005 244/231 |
| 2,162,624 | A * | 6/1939 | Logue | F16H 7/02 209/269 |
| 2,326,104 | A * | 8/1943 | Petrich | B64D 35/04 244/65 |
| 2,529,629 | A * | 11/1950 | Pullin | B64C 27/54 244/17.23 |
| 2,651,480 | A * | 9/1953 | Pullin | B64C 27/08 244/17.23 |
| 3,691,860 | A * | 9/1972 | Danuser | F16H 7/02 474/135 |
| 5,645,250 | A * | 7/1997 | Gevers | B64D 29/04 244/50 |
| 6,343,768 | B1 | 2/2002 | Muldoon | |
| 10,156,288 | B2 * | 12/2018 | Kereth | B64C 27/20 |
| 10,604,242 | B2 * | 3/2020 | Chan | B64C 27/80 |
| 11,530,033 | B2 * | 12/2022 | Preisser | B64C 27/14 |
| 2013/0231208 | A1 * | 9/2013 | Buono | B64D 27/24 475/5 |
| 2015/0028597 | A1 | 1/2015 | Eller et al. | |
| 2015/0219398 | A1 * | 8/2015 | Santoro | F04D 19/007 62/314 |
| 2016/0059958 | A1 | 3/2016 | Kvitnevskiy | |
| 2018/0030887 | A1 * | 2/2018 | Zhao | B64C 27/14 |

FOREIGN PATENT DOCUMENTS

| | | |
|---|---|---|
| CN | 103786880 A | 5/2014 |
| CN | 203753399 U | 8/2014 |
| CN | 105015768 A | 11/2015 |
| CN | 105197232 A | 12/2015 |
| CN | 105460213 A | 4/2016 |
| CN | 105752331 A | 7/2016 |
| CN | 205837187 U | 12/2016 |
| CN | 106628155 A | 5/2017 |
| CN | 206579842 U | 10/2017 |
| CN | 107985583 A | 5/2018 |
| GB | 191327315 A | 11/1914 |
| JP | H04228956 A | 8/1992 |
| JP | H11291992 A | 10/1999 |
| JP | H11342899 A | 12/1999 |
| WO | 2009138731 A1 | 11/2009 |
| WO | 2011131177 A1 | 11/2011 |
| WO | 2016108218 A1 | 7/2016 |
| WO | 2017035593 A1 | 3/2017 |

OTHER PUBLICATIONS

European Patent Office. Extended European Search Report for application PCT/SE2017/050702. Mailed no Dec. 8, 2020. 5 pages.

International Preliminary Examining Authority. International Preliminary Report on Patentability for application PCT/SE2017/050702. Mailed on Jul. 11, 2019. 9 pages.

Taiwan Patent Office. Search Report for application No. 107121646. With translation. Mailed on Sep. 24, 2021. 6 pages.

National Intellectual Property Administration, PRC, First Office Action and Search Report, Application No. 2017800924872, Dec. 1, 2022, 14 pages.

\* cited by examiner

ROTOR FLIGHT VEHICLE

This application represents the U.S. national stage entry of International Application No. PCT/SE2017/050702 filed Jun. 26, 2017, the disclosure of which is incorporated herein by reference in its entirety and for all purposes.

The present invention relates to a rotor flight vehicle according to the precharacterizing part of claim 1.

PRIOR ART

Rotor flight vehicles have been known for a long time. In general a rotor flight vehicle has a powered rotor that adds lift to the vehicle. Different systems of propulsions of the rotors have been suggested. In more recent years unmanned drones have applied a system of using one motor per rotor. Usually this motor is electric which provides for excellent control of the rotational speed of the rotor, and consequently an easy to control rotor flight vehicle.

SHORT DESCRIPTION OF THE INVENTION

The present invention is related to a rotor flight vehicle comprising a first rotor, a power unit, a transmission from the power unit to the first rotor, wherein said transmission comprises at least one belt, a group of rotational axes, at least one power output axle connected to the power unit and at least one rotor axle connected to said first rotor, the belt being an endless belt having a length and a width, the belt is applied to the power output axle, the power output axle is concentric with a rotational axis, the belt transmits power to the rotor axle, the rotor axle is concentric with a rotational axis, wherein consecutive rotational axes of the group of rotational axes extend in a relation to each other such that the angle between them is in the range of 80-100 degrees, preferably essentially 90 degrees, wherein the belt as applied in the transmission has a maximal torsion of 80-100 degrees, preferably essentially 90 degrees, in the belt's transition between two respective consecutive rotational axes of the group of rotational axes.

The effect of arranging a rotor flight vehicle according to the above is that the maintenance is simplified. Also the wear of transmission is reduced. And the safety of the rotor flight vehicle can be improved as it is simplified to add redundancy in the transmission. The belt will not wear as quickly with this arrangement. In particular the belt is not only having torsion in one direction but both to the left and to the right. Also this design makes it is possible to have only one motor for the rotor flight vehicle.

According to a further aspect of the rotor flight vehicle the transmission, the belt runs around all of the rotational axes in the group of rotational axes.

The effect of this is that a single belt is used for the transmission from the power output axle to the rotor axle. This simplifies the construction and thus increases safety.

According to a further aspect of the above the rotor flight vehicle the belt has a first side and a second side, wherein the belt is installed in such a way that it always turns the same side towards the respective rotational axis.

By arranging the belt like this the inside of the belt can be improved for friction etc. and still the outside need not be this.

According to a further aspect of the above rotor flight vehicle none of the rotational axes in the group of rotational axes, are parallel with each other.

The rotor flight vehicle is simplified in its design and maintenance if the power unit need not be directly associated with the rotational axis of the rotors.

According to a further aspect of the rotor flight vehicle according to the above the belt is a timing belt comprising teeth on the inside and preferably comprised transmission pulleys rotatable around a respective rotational axis comprises grooves for accommodating said teeth.

This is particularly advantageous as the belt will not slip as easily. This in turn provides for a very safe transmission that will lower vibrations etc.

According to a further aspect of the rotor flight vehicle according any of aspects above, wherein the connection between the belt and the respective rotational axis of the rotor, comprises at least one, one-way bearing, such as a sprag clutch, such that the belt can only power the rotor in one direction.

This greatly improves the safety of the rotor flight vehicle, as the rotor if the power is reduced can be allowed to temporarily rotate faster than the rotor axle. It also provides for the possibility of autorotation, when the power unit is no longer in operation.

According to a further aspect of the rotor flight vehicle according to any of the aspects above, wherein the power output axle comprises two transmission pulleys, further are comprised two transmission pulleys to the rotor axle, wherein the belt extend from the power output axle around the first transmission pulley and runs back around the power output axle and back to the second transmission pulley, before returning back to the power output axle, such that the first transmission pulley and the second transmission pulley rotates in the opposite direction and only the first transmission pulley powers the rotation of the rotor axle, preferably the first of the transmission pulleys of the rotor axle has a one-way bearing attachment, such as a sprag clutch, and the second transmission pulley has a two way rotational bearing attachment to the rotor axle.

By arranging the transmission as this there is a particular advantage as the belt will wear much less than when not using this double-loop-arrangement. A single loop is thus much less advantageous. In particular the belt is not only having a torsion in one direction but both to the left and to the right.

According to a further aspect of the rotor flight vehicle according to any of the aspects above, wherein the power unit comprises a combustion engine or an electric motor.

A combustion engine is a well proven concept that is safe for a flying vehicle.

According to a further aspect of the rotor flight vehicle according to any of the aspects above, the rotor flight vehicle comprises a second rotor and a second transmission powering the second rotor, wherein the second transmission is constituted in the same manner as the first transmission, comprising a second belt applied to the power output axle, preferably the second rotor is applied to a rotor axle that is arranged to rotate in the opposite direction of the rotor axle of the first rotor, the opposite rotation is achieved by means of adapting the path of a second belt such that it essentially is a mirror arrangement compared with the path of belt of the first rotor thus giving the opposite rotational direction of the rotor axle despite having the same rotational direction at the power output axle.

To arrange same transmission for the two rotors provides same advantages as for the first discussed transmission also for the second transmission. Another advantage is that one single power output axle is used. The rotation of the power output axle is in a single direction. This simplifies the arrangement of the power output axle.

According to a further aspect of the rotor flight vehicle according to any of the aspects above, wherein the group of rotational axis of the transmission comprises three consecutive rotational axes.

With three consecutive rotational axes a well-balanced rotor flight vehicle is easy to achieve as the power unit can be positioned at a low position in the vehicle.

According to a further aspect of the rotor flight vehicle according to any of the aspects above wherein at least one, preferably all, of the rotors have collective and/or cyclic pitch, preferably cyclic pitch is arranged by comprising rotor axles that comprise/s a swashplate for controlling the blades of the rotor/s, preferably the control of the swashplate is achieved by a group of power means being at least three power means connected to said swashplate.

The control of the rotor flight vehicle can be achieved by only collective pitch, in particular for a quadrocopter aspect. This allows for exact control of thrust of each rotor. It is a particular advantage implemented as the input rotational power to each rotor can be kept constant and each rotor thus can receive essentially the same rotational inputted power. With cyclic pitch added and advanced manoeuvring can be achieved that is in particular provides for use with two main rotor variants. With a swashplate arrangement the manoeuvrability is greatly improved of the rotor flight vehicle, as the cyclic pitch is achieved through this arrangement in a straight forward manner.

According to a further aspect of the rotor flight vehicle according to any of the aspects above wherein it comprises at least three rotors where each rotor has its own transmission.

Each rotor will then have easy maintenance as all transmissions need not be addressed at the same time.

According to a further aspect of the rotor flight vehicle according to any of the aspects above wherein the same power unit powers all rotors of the flight vehicle.

This provides for a simple construction that simplifies the maintenance of the power unit.

According to a further aspect of the rotor flight vehicle according to the previous aspect above, wherein the rotor flight vehicle comprises a further power unit that act in parallel by transmitting power to the same drive axle as the first power unit and can thus redundantly replace the first power unit as single power unit for powering the rotor flight vehicle.

This allows for fulfilling complex aerial regulations that require redundant power units in a flying vehicle, for example for flying over habituated areas.

According to a further aspect of the rotor flight vehicle according to any of the aspects above, wherein the rotor flight vehicle is a drone.

The particulars discussed with all aspects above are best used in a professional drone that operates without a flying pilot. The secure transmission will be best applied if no space need be taken up by controls and seat for a pilot.

According to a further aspect of the rotor flight vehicle according to any of the aspects above, wherein the rotor flight vehicle has redundant transmissions to each comprised rotor, by means of a complete second transmission extending from the power output axle to the rotor axle, comprising a second belt.

According to a further aspect of the rotor flight vehicle the power output axle comprises two transmission pulleys, wherein a first rotor axle comprises a first transmission pulley and a second rotor axle comprises a second transmission pulley, wherein the belt extend from the power output axle around the first transmission pulley and runs back around the power output axle and back to the second transmission pulley, before returning back to the power output axle, such that the first transmission pulley and the second transmission pulley rotates in the opposite direction and the respective transmission pulleys powers each a dedicated rotor axle that are coaxial and counter rotating, preferably there are comprised two one-way bearings either as attachment for the respective transmission pulleys to the rotor axes and/or at the transmission pulleys to the power output axle.

The advantage of this is that it is possible to create a coaxial rotor flight vehicle using only one power source, and one single band.

LIST OF DRAWINGS

FIG. 1 discloses a rotor flight vehicle according to the invention.

Figure 2:
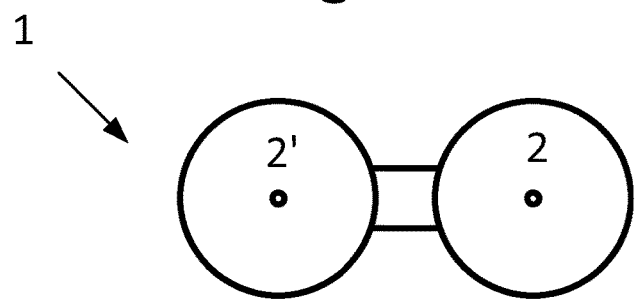

FIG. 2 Discloses a rotor flight vehicle according to FIG. 1 with two rotors.

Figure 2A:
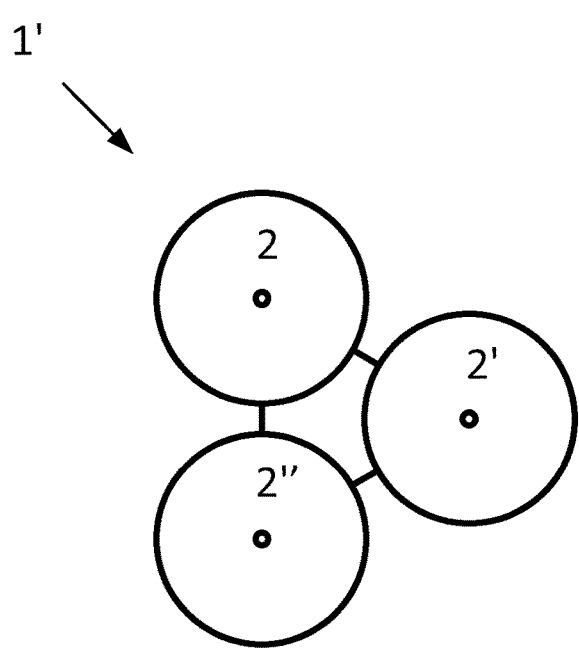

FIG. 2a Discloses a rotor flight vehicle according to FIG. 1 with three rotors.

Figure 2B:
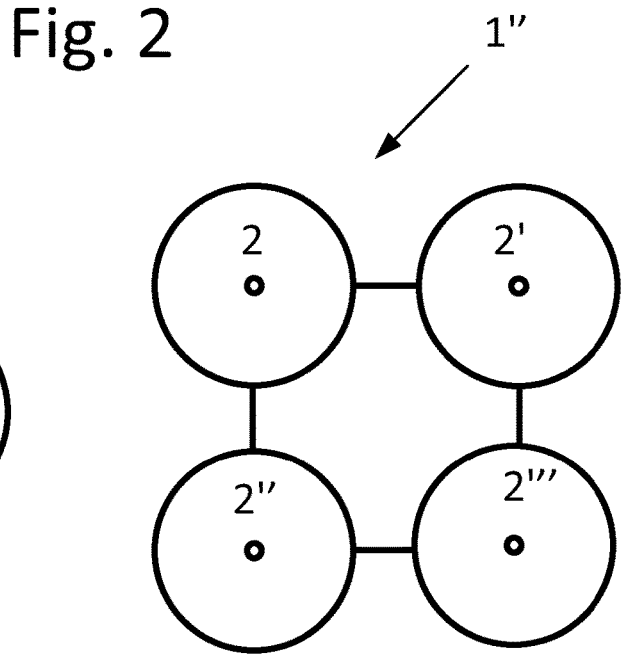

FIG. 2b Discloses a rotor flight vehicle according to FIG. 1 with four rotors.

Figure 3:
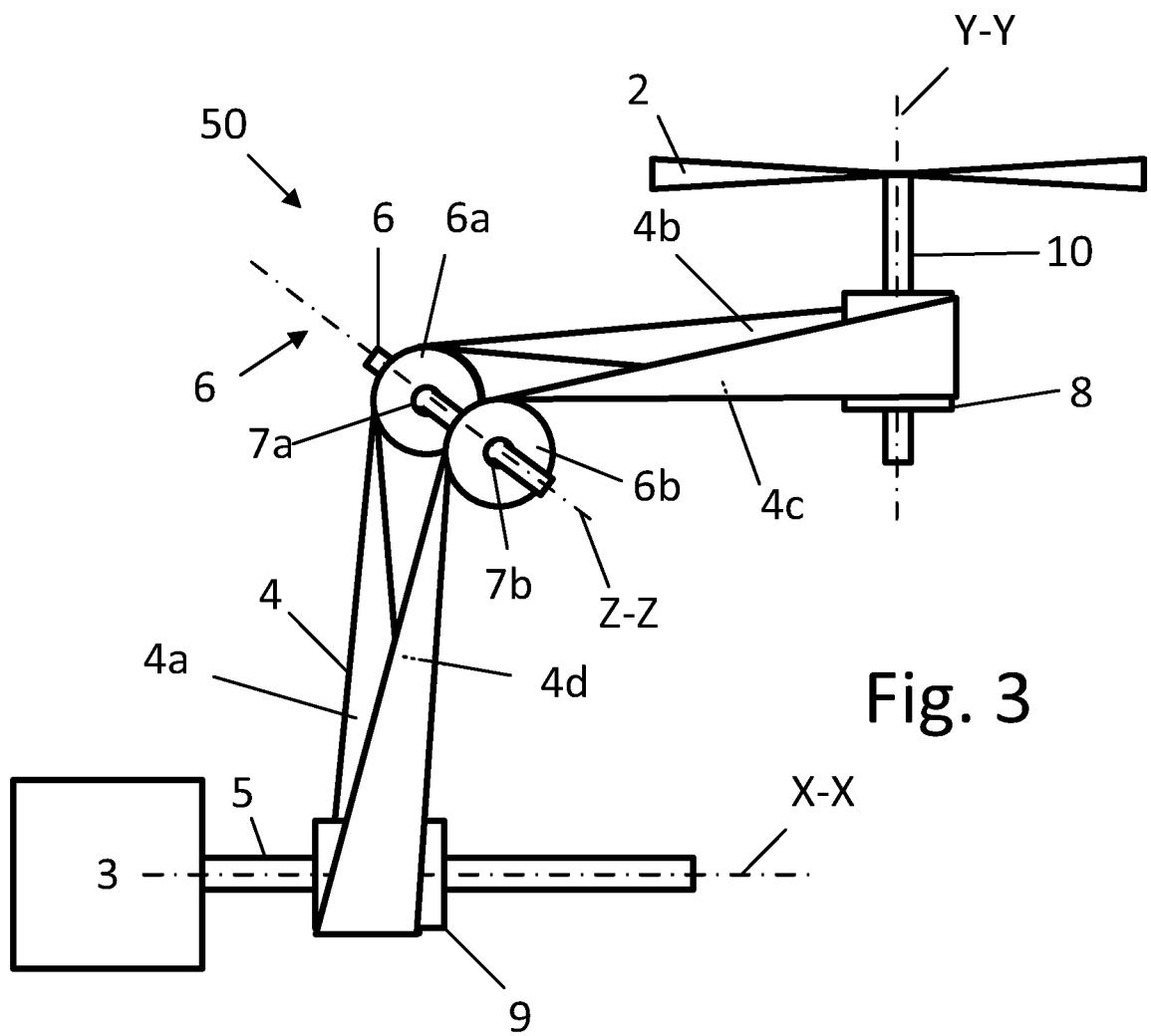

FIG. 3 discloses a power unit and a transmission for one rotor of a rotor flight vehicle of the present invention.

Figure 4:
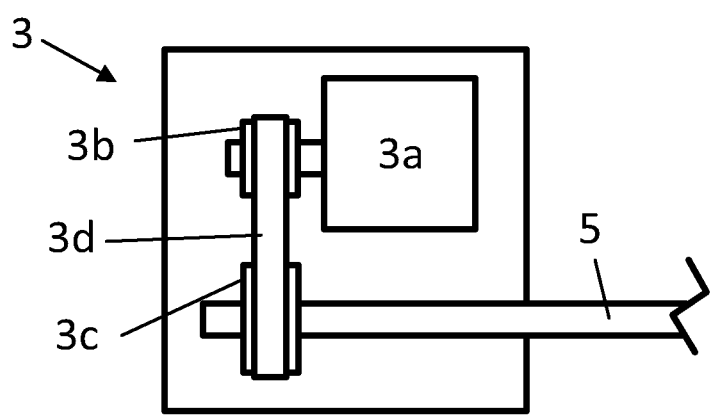

FIG. 4 discloses an exemplified power unit of the invention.

Figure 5A:
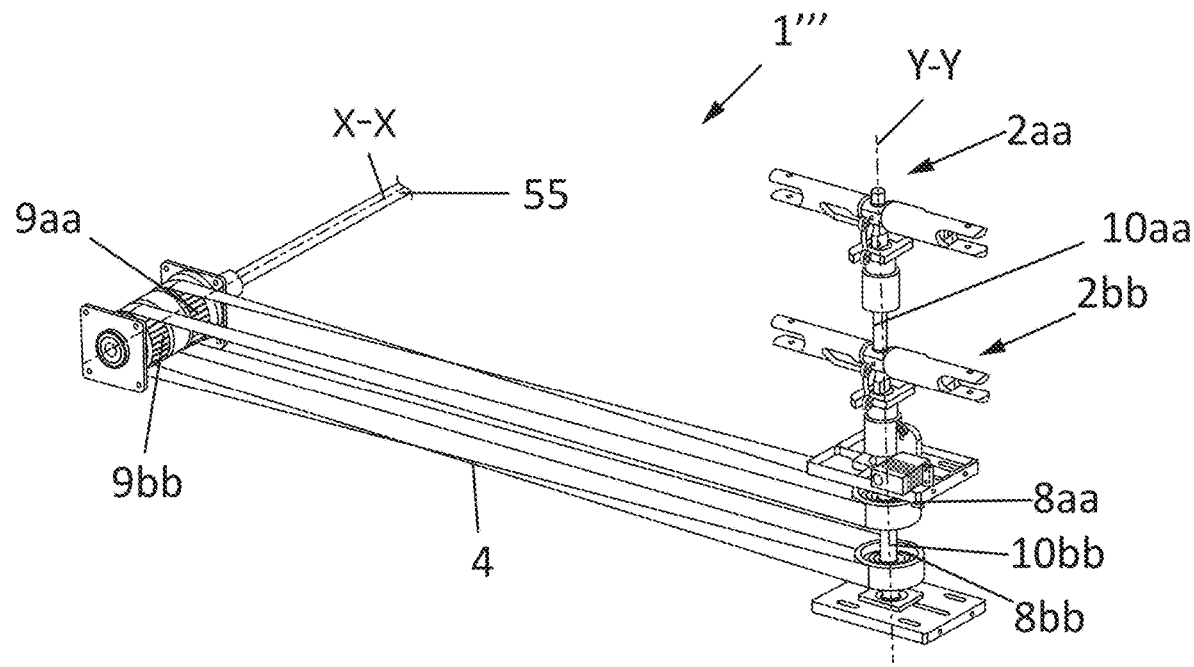

FIG. 5a discloses a coaxial variant of a rotor flight vehicle according to an aspect of the present disclosure.

Figure 5B:
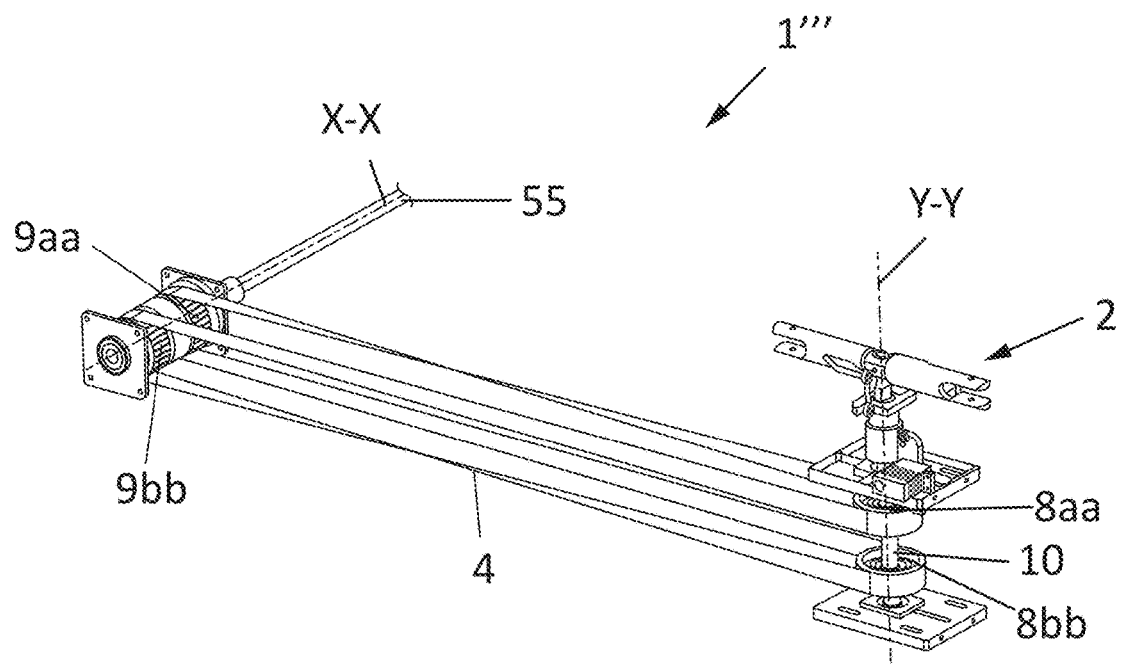

FIG. 5b discloses a rotor flight vehicle according to an aspect of the present disclosure.

Figure 6:
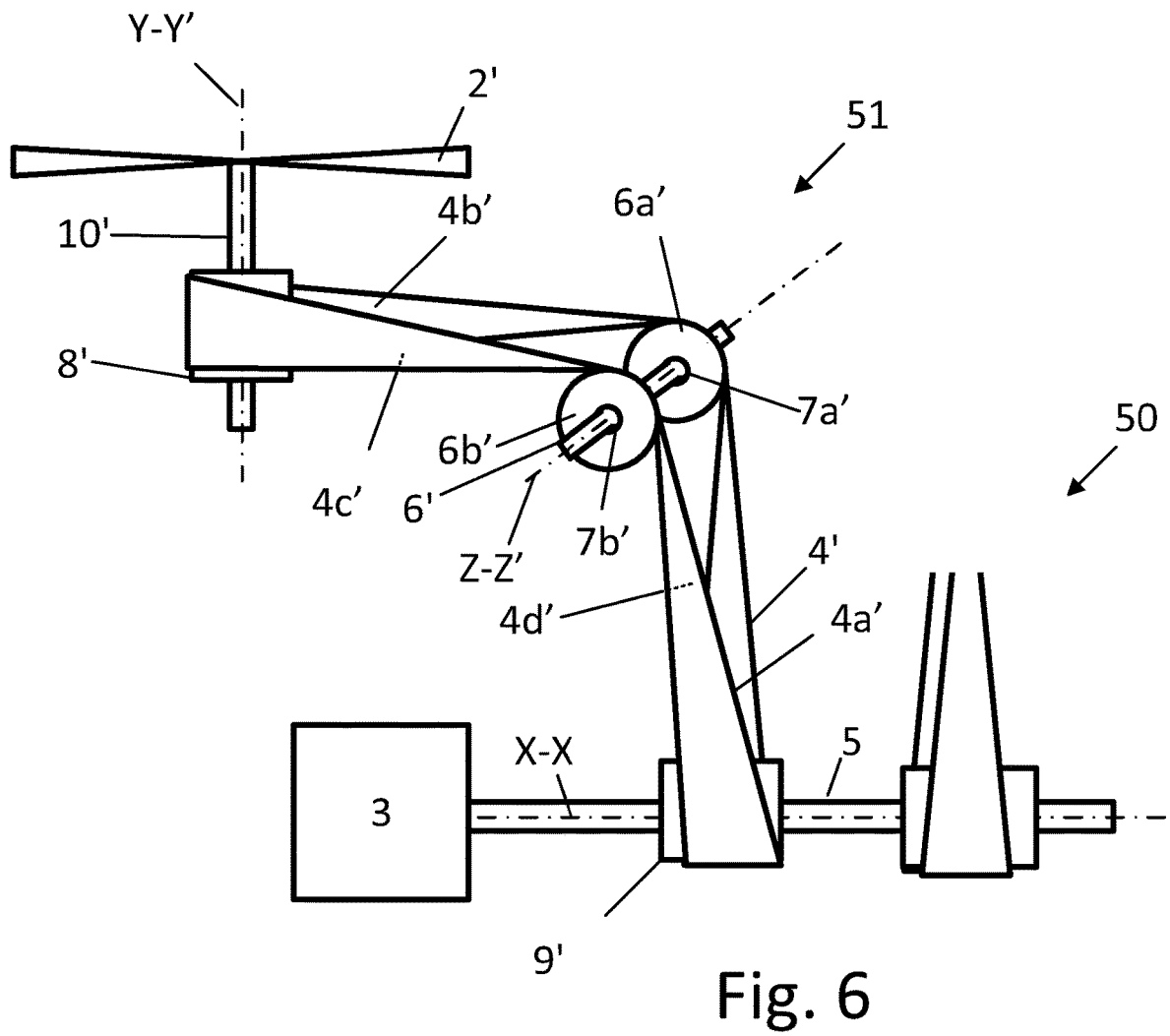

FIG. 6 discloses a second rotor with transmission to be used with FIG. 3 disclosure.

Figure 6A:
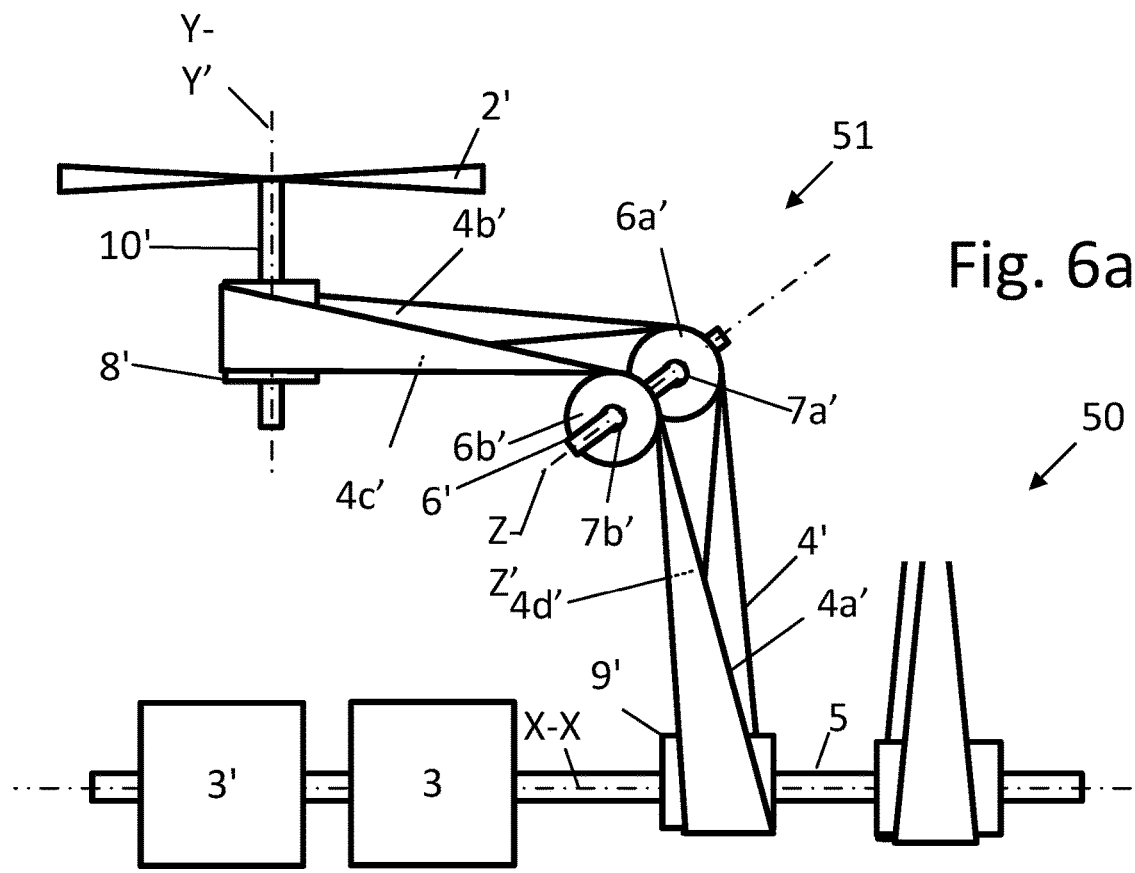

FIG. 6a discloses a second rotor with transmission to be used with FIG. 3 disclosure and a double power unit.

Figure 6B:
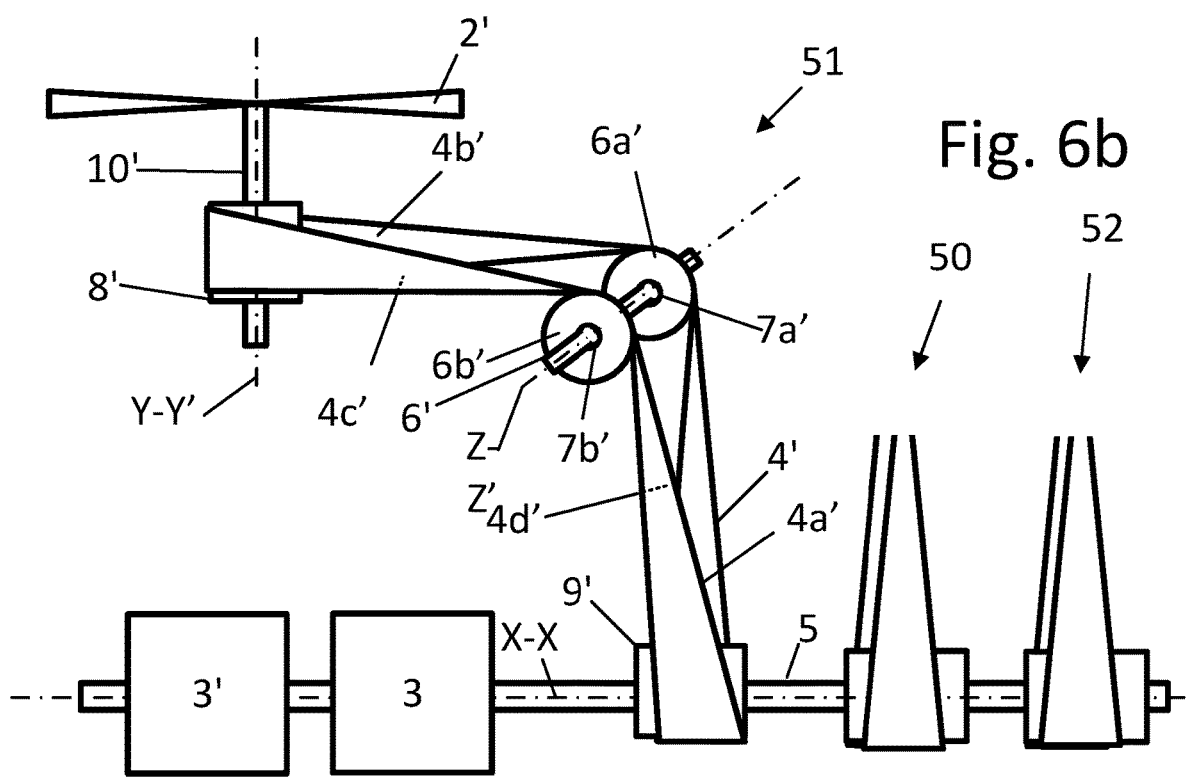

FIG. 6b discloses a second rotor with transmission to be used with FIG. 3 disclosure, a double power unit and a third transmission.

Figure 7:
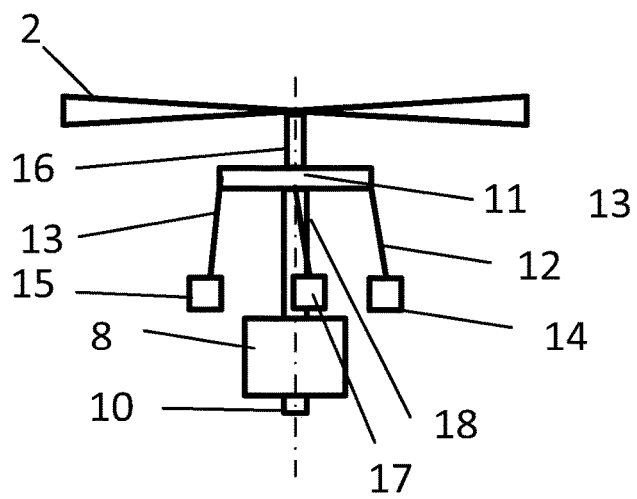

FIG. 7 discloses a rotor including a swashplate, possible to use with the disclosure of FIGS. 1-6, 6a, 6b, and FIGS. 8-10.

Figure 8:
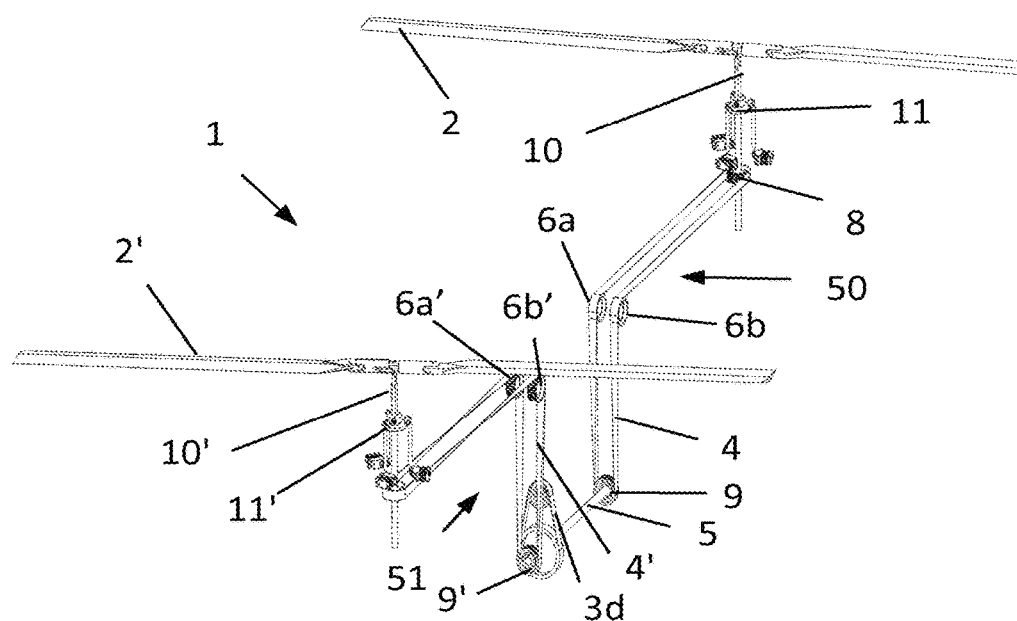

FIG. 8 discloses a complete view of a rotor flight vehicle according to the invention.

Figure 9:
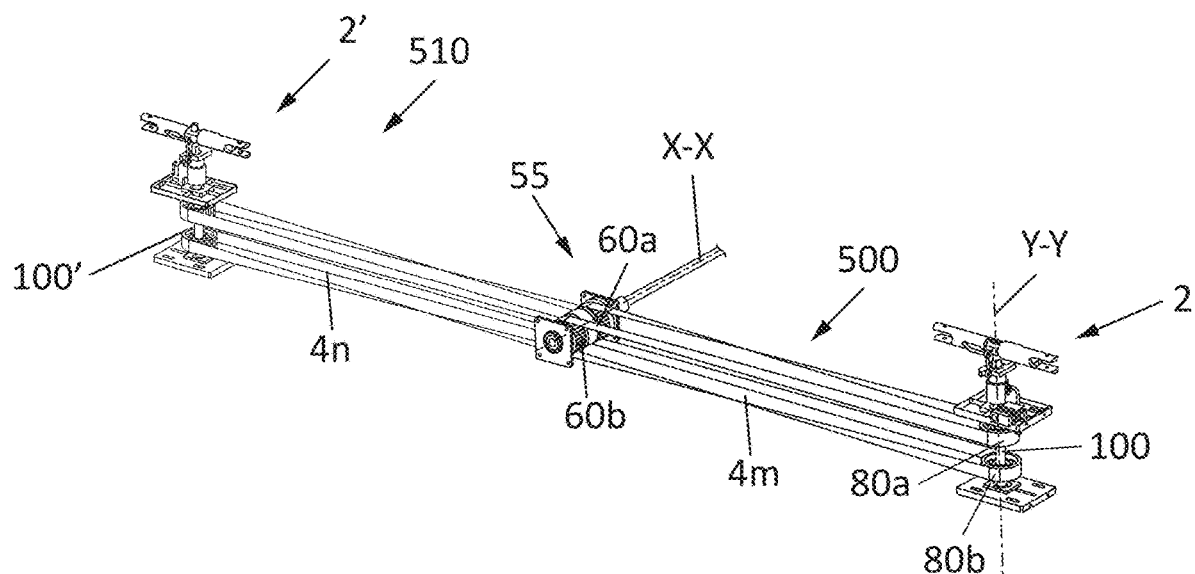

FIG. 9 discloses an alternative variant of the transmission of a rotor flight vehicle according to the invention.

Figure 10:
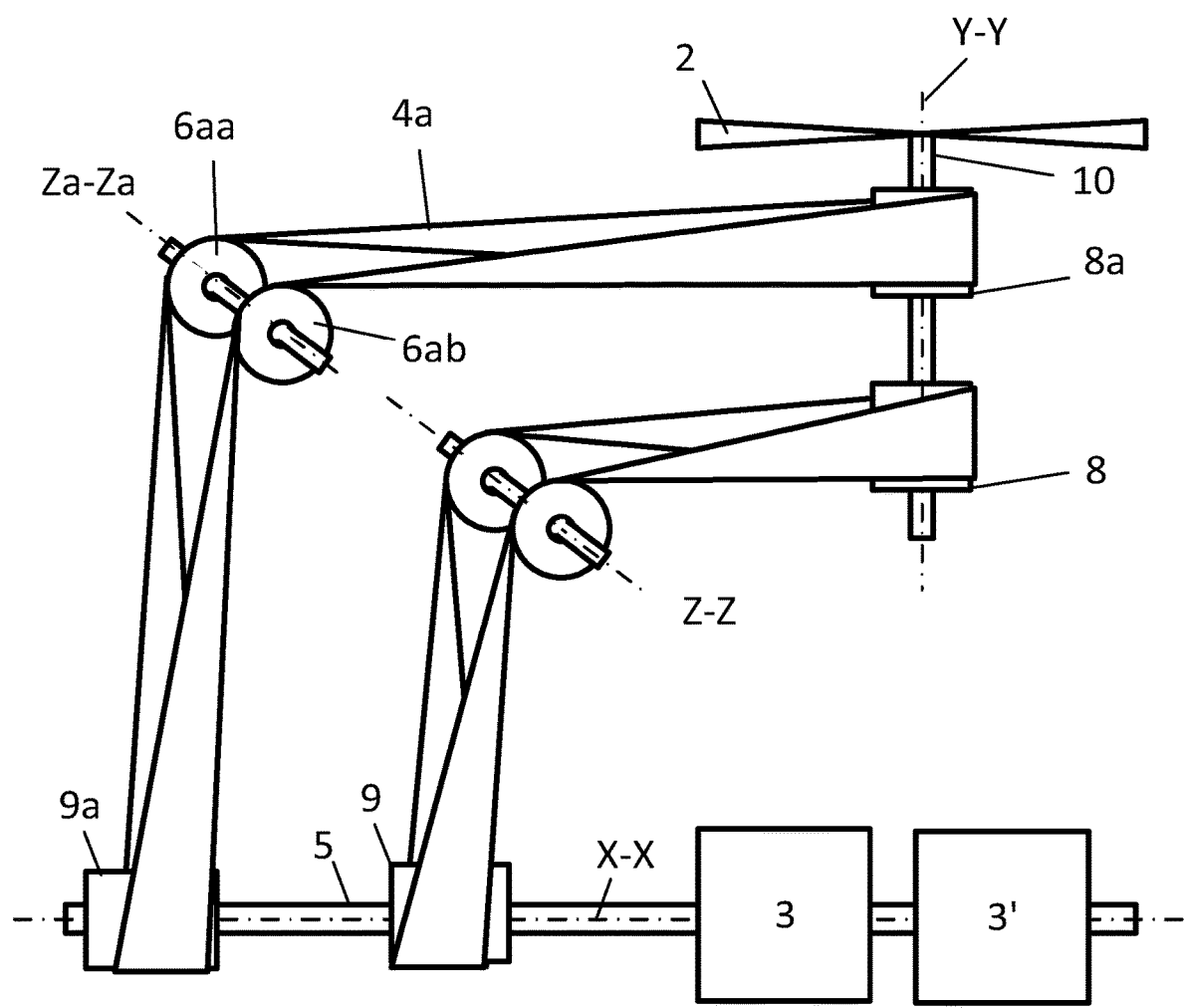

FIG. 10 discloses a transmission with redundant transmission. Applicable to all aspects including FIG. 3, 6a, 6b and also 9 with modification.

DETAILED DESCRIPTION

The present disclosure is related to rotor flight vehicles such as disclosed in any of the FIGS. 1-2, 2a, and 2b. The rotor flight vehicle has in general a rotor. It could be referred to as a helicopter. The general disclosure is that it is to operate without a flying pilot, i.e. a drone, such as a tri-copter, quadrocopter or a multicopter. Also a twin rotor drone as disclosed with two lift providing rotors is within this concept. The rotor is powered through a belt transmission from a power unit. The belt has torsion between rotating axes that is between 80 and 100 degrees, preferably essentially 90 degrees. The rotor flight vehicle has in general two counter rotating rotors. For controlling the rotor flight vehicle a swashplate can be arranged on the rotor axle. The swashplate controls the blades of the rotor such that the rotor flight vehicle can be controlled, this without altering the power input to the respective rotor. The power unit can be any power unit suitable for delivering rotational power. However tilt is not the only way of controlling. By having a multirotor i.e. more than two main rotors it is possible to control a rotor flight vehicle only by changing the thrust power of each rotor individually. This can for example be achieved by altering the blade angle by for example collective pitch of each individual rotor. It is also thinkable to combine collective pitch and cyclic pitch for control of the vehicle. If there are more than two rotors there are always two rotors rotating in the same direction.

The transmission of the rotor flight vehicle has a power output axle. This axle powers the belt that then extends in a loop to the rotor axle. In between the power output axle there can be further axles before the belt reaches the rotor axle. It is preferred that the path of the belt is controlled by transmission pulleys. It is preferred that the transmission pulleys have the same size, at least a transmission pulley on a power output axle of a power unit and a transmission pulley on a rotor axle.

Definition rotational axis, throughout the present disclosure the expression rotational axis does not mean an axis which rotates in itself, it only describes a direction of an axis around which elements or axles are rotating, sometimes in same direction, but sometimes in different direction, but still on same rotational axis.

FIGS. 1 and 2 describes a rotor flight vehicle 1 according to the disclosure. It has two rotors 2, 2'. The rotors can have any number of blades. The rotors 2, 2' are positioned on respective rotor axles 10, 10' see FIGS. 3 and 6. It is preferred that the rotors 2, 2' are connected around the rotor axle 10, 10' by means of a one-way bearing, such as a sprag clutch, such that the rotors, if having more inertia than that is provided by power to the rotor, can rotate faster than the rotor axle 10, 10'. This would occur for example when reducing power to the rotors 2, 2'. The rotor axles 10 and 10' rotates around the rotational axes Y-Y and Y-Y'. However for any described aspect it is possible to use only one one-way bearing at the power output axle 5 for example as seen in FIG. 4 in position for the transmission pulley 3b or 3c. And further if the power unit comprises a gas turbine one-way bearing may optionally be dispensed with. The path of the first belt 4 of the first rotor and path of the second belt 4' is essentially mirrors of each other thus achieving counter rotating rotors 2, 2'. With two rotors it is preferred to have both collective pitch and cyclic pitch for controlling the rotor-flight vehicle.

FIGS. 2a and 2b discloses rotor flight vehicle 1 of FIG. 1 but with three and four rotors 2, 2', 2" and 2, 2', 2", 2'". The essential technology is the same for further rotors added. Each rotor preferably has their own transmission 50, 51, 52 etc. For three and further rotors collective pitch is preferred as the means of controlling the thrust of each rotor individually. This allows for control of the complete rotor flight vehicle. Thus cyclic pitch is not mandatory for three or further rotors added.

FIG. 3 discloses a part of the transmission 50 of the rotational power of one rotor 2 from a power unit 3, with further added transmissions and rotors a rotor-flight vehicle of the present disclosure is achieved. The power unit 3 provides a rotational output on the power output axle 5. The power output axle 5 is extending from the power unit 3, however it should be understood that the power output axle 5 could extend on both sides of the power unit 3 not only one side as disclosed in FIG. 3. The axle 5 rotates around the rotational axis X-X, which are concentric with each other. On the axle 5 is a transmission pulley 9 situated in a fixed attachment to the axle. To the transmission pulley 9 is a belt 4 associated. The transmission pulley 9 can be substituted to a direct attachment to the axle 5. The direct attachment can be a round circumferential protrusion around the axle 5 that for example has the same outer diameter as the transmission pulley 9. The belt 4 runs around the transmission pulley 9, up to a transmission pulley pair 6a, 6b rotatable around a common axle 6. However following the path of the belt it first runs around transmission pulley 6a and then after powering the rotor axle 10, the belt 4 runs back over the transmission pulley 6b. Thus transmission pulley 6a and 6b are counter rotating around a common rotational axis Z-Z. This arrangement is preferably made possible by having the axle 6 as a fixed axle and the respective transmission pulleys 6a and 6b have separate bearings 7a, 7b to the axle 6. A single section, disclosed as insides 4a or 4d, of the belt 4 has torsion from the axle 5 to axle 6 of essentially 90 degrees, but it could be any angle between 80 and 100 degrees, to the axle 6. From this axle 6 the belt 4 continues to the rotor axle 10, with the same torsion of the belt as from the axle 5 to the axle 6, but of course in a different plane. The rotor axle 10 rotates around an axis Y-Y. The same side of the belt 4 is always turned towards the respective axle 5, 6, 10. The inside is the same but denoted 4a, 4b, 4c and 4d in FIG. 3 for the single transition of a single section of the belt 4 between each consecutive axle 5, 6, and 10. On the last rotor axle 10 there is a transmission pulley 8. The transmission pulley 8 is attached to an axle which is associated with the first rotor 2. This transmission pulley 8 could be attached with a one-way bearing such as a sprag clutch as discussed above. But as mentioned earlier this one-way bearing could be attached to the power output axle 5. But also if the power unit comprises a gas turbine a one-way bearing may optionally be dispensed with. Transmission pulleys 9, 8, 6a, 6b should preferably have the same diameter.

The belt 4 can be any belt suitable for the purpose such as a timing belt, a flat belt, round belt, V belt, multi-groove belt, ribbed belt. However it is preferred to have a timing belt together with transmission pulleys 9, 6a, b, 8 that have a correspondence groove pattern as the teeth of the belt 4. This provide for precise control of the rotational velocity of the rotor axle 10, but also for the ability to transfer enough power to the rotor axle 10. This is also valid for all aspects bellow of the present disclosure.

The power unit 3 as seen in FIG. 3, 6, 6a, 6b, 10, is preferably a combustion engine, it can be a motor running on gasoline or diesel, but it could also be a gas turbine, or an electric motor, such as a brushless electric motor. In general a gas turbine has the advantage that it will dispense with need of a one-way clutches in the transmission. The power output from the power unit can be an axle extending directly from the engine or motor 3a, but preferably a transmission gear 3a, 3b, 3c, 3d is used. An example of a transmission gear can be seen in FIG. 4. A smaller transmission pulley 3b has a drive belt 3d attached around it and then the belt 3d runs around a larger belt transmission pulley 3c. Thus the transmission gear is preferably reducing the rpm of the power unit 3a to the power output axle 5 for power output from the power unit 3.

FIGS. 1 and 2 discloses the rotor flight vehicle 1 with two rotors 2 and 2' that rotates in opposite direction compared with the first rotor 2. This is achieved by the reversed threading of the belt 4' a second transmission 51, FIG. 6. All duplicated but equal details are denominated with a "'". However the power unit 3 is preferably the same as the one disclosed in FIG. 3. Also the power output axle 5 is the same as for FIG. 3. But it should be understood that the power output axle 5 can protrude to the left of the power unit 3 for attachment of the belt 4' of the second transmission 51.

FIG. 6a discloses essentially the transmission and possible rotor flight vehicle of FIG. 3, and further also discloses that it is possible to have a second power unit 3'. As positioned in FIG. 6a it is powering the power output axle 5 together with the power unit 3. By applying two power units 3, 3' that alone can power the rotor flight vehicle 1 for flight it is possible to have a redundant power system of the rotor flight vehicle.

FIG. 6b discloses addition of a third transmission 52 for powering a further rotor 2" as seen in FIG. 2a. The transmission 52 remains the same as the previous transmissions 50 and 51. FIG. 6b also discloses an optional second power unit 3'. It is essentially an aspect according to FIG. 3 with added rotors and transmissions.

Both FIG. 6, 6a, 6b could be arranged with a power output axle 5 that extend through one or two power units 3, 3' for attachment of transmissions on both sides of the power unit/s 3/3'.

FIG. 7 discloses a swash plate 11 that can be used with any of the rotors 2, 2', 2", 2'" of the present application, for so-called cyclic pitch control via swashplate. The swashplate 11 is controlled by power means 14 and 15, 17. The power means are in general at least three. The power means 14, 15, 17 engages and controls the swashplate 11 by means of transmission bars 12 and 13, 18. The power means 14, 15, 17 are preferred to be servos.

For a two rotor flight vehicle of FIG. 2, the swashplates 11 are mandatory. However for the rotor flight vehicles 1', 1", 1'" with more than two rotors, FIG. 2a, 2b, swashplate 11, can be left out. But still collective pitch of the rotors 2, 2', 2" are then mandatory in order to control the rotor vehicle. Collective pitch can also be used together with swashplates in any configuration of number of rotors etc.

FIG. 8 discloses a complete transmission of a rotor flight vehicle 1 of the present disclosure. A power unit would be fitted as in FIG. 4 and the transmission pulley 3d would correspond to the same transmission pulley 3 in FIG. 8. However it must be understood that the power unit can be fitted in any suitable way. The first belt 4 and the second belt 4' can also receive their respective power output form opposite sides of the power unit. The disclosure of FIG. 8 is essentially a disclosure of FIG. 3 in combination with FIG. 6 but the power unit is not present. FIG. 8 also discloses swash plates 11, 11' at the respective rotor axle 10, 10'.

FIG. 9 discloses a transmission 500. The transmission is in itself the same as that of for example FIG. 8, but also FIG. 3, 6, 6a, 6b, 10, i.e. the bands still have a torsion of 80-100 degrees between rotating axes, preferably 90 degrees. But there is a difference in that the power output axle 55 corresponds in FIG. 8 to axle 6 of FIG. 3. The belt 4m and the belt 4n both power a dedicated rotor 2, 2'. By running the belt in a double loop the torsion of the belt is never more than 80-100 degrees or preferably essentially never more than 90 degrees. The coupling to the rotor axle 100 is made by means of two transmission pulleys 80a, 80b. The first transmission pulley 80a has a one-way bearing, such as a sprag clutch. Thus the belt 4m powers the rotor axle 10 through the transmission pulley 80a. The other transmission pulley 80b is attached with a bearing to the rotor axle 100. However as the bearing of the second transmission pulley 80b provides for rotation in both directions, the transmission pulley 80 is actually not rotating with the axle 100. Instead transmission pulley 80b is counter rotating at the same rotational speed as the first transmission pulley 80a. The same arrangement is provided for the transmission pulleys 60a, 60b at the power output axle 55. Transmission pulley 60a rotates with the axle 55, possibly with a one-way bearing or not, and the transmission pulley 60b counter rotates at the same speed but negative speed as the transmission pulley 60a. In order for the arrangement to function to satisfaction transmission pulleys 80a, 80b and 60a, 60b, should have the same diameter.

The aspect as disclosed of FIG. 9 is preferred to be comprised in a quadrocopter 1" arrangement, FIG. 2b, where there are four belts connected to the main power output axle 55, in the same configuration as in the FIG. 9. The quadrocopter 1" is thus powered by this arrangement. Control of the quadrocopter is then performed by collective pitch of the respective rotor blades of each rotor. As with previous aspects above the power unit can be the same, the one-way bearing of the rotors the same, any gear from the power unit can be the same. In other words the axle 5 of FIG. 3, 6 can correspond to the power output axle 55.

It should be understood for any disclosure that there in general is possible to adopt a double redundancy. In particular it is possible to provide double power units with double power output and double transmissions to each rotor. This means that not only the power units can be doubled for example by providing a second power unit 3a, FIG. 6a, 6b to the axle 5, with or without a gear 3a, b, 3c, 3d. Also the transmission from the axle 5, to the rotors can be doubled by providing further belts with further transmission pulleys. The main configuration of each belt remains the same though. This would be done by providing a doubled transmission pulley 9 on the axle 5, a double transmission pulley on the axle 6, and a double transmission pulley on the rotor axle 10. This would also mean for the discussed disclosure of FIG. 9, that there are four transmission pulleys 80a, 80b on the rotor axle 10 and four transmission pulleys 60a 60b on the axle 50 and two belts 4. The configuration is doubled and each single transmission would have the same configuration as the discussed transmission above in line with FIGS. 3, 6, 6a, 6b, 9. See for example FIG. 10 where it is disclosed a further belt 4a and transmissions pulleys 9a, 6aa, 6ab, 8a. This provides safety if first transmission fails. This is also applicable in transmission 500 of FIG. 9, as well as all other transmissions. In FIG. 10 the second middle rotational axis Za-Za is marked as a separate axis from Z-Z, but of course they can be the same rotational axis. And even if transmission is redundant the marked extra power unit 3' is optional and only one power unit 3 can be present. It should be understood that the belt can be a belt with two sections in transversal direction. Such that it is in practice two belts but the two belts are joined at one side. In event of rupture of one belt, the joint between the two belts does not affect the remaining fully functional belt.

A preferred solution is to apply a broad belt in each position and use a double transmission pulley that has a ridge between the transmission pulleys and then split the broad belt into two thinner belts, or almost split the broad belt. This then gives a two belt system where one of the two belts can break without jeopardizing the other belt. This solution is applicable for any of the described aspects of the rotor vehicle.

For a swashplate solution 11 it is also possible to add redundant power means 14, 15, and 17. That is each power means, has a twin that can control its section of the swashplate alone, should the first power means have lost functionality or broken down completely.

FIG. 5a discloses a coaxial variant 1''' of the present disclosure. Two coaxial axles 10aa and 10bb powers each dedicated rotor 2aa and 2bb, the rotor blades have not been added to FIG. 5a for visibility reasons. The two rotors 2aa, 2bb are counter rotatable by means of a dedicated belt 4. For this model also there are transmission pulleys 9aa, 9bb on the power output axle 55. In the rotor flight vehicle 1''' of FIG. 5a there is one one-way bearing preferably attached between power output axle 55 and a power unit. However as with above aspects if the power unit is a gas turbine the one way bearing can optionally be dispensed with. It is preferred to have a swashplate system applied that is used on coaxial rotor flight vehicles. Further it should be understood that there are only one single belt 4 that powers both rotors. The transmission pulleys 8aa, 8bb are thus counter rotating. The FIG. 5a rotor flight vehicle is essentially half of the rotor flight vehicle as disclosed in FIG. 9, but with the coaxial arrangement added.

It is also thinkable to make a tricopter FIG. 2a that is a mix of FIGS. 8 and 9 aspects. Half of the transmission of FIG. 8 is used for one rotor. On the axle 5 is then the axle 55 of FIG. 9 arrange with two rotors 2', 2 and all other comprised components of FIG. 9. This will lead to a tricopter arrangement which is also possible to power by only one power source.

The present disclosure is also valid for any type of rotor flight vehicle, a helicopter, tricopter, quadrocopter, and even though not intended for it is applicable to a manned rotor flight vehicle.

In a multirotor configuration it is preferred that the rotors are associated in pairs rotating in the same direction, and corresponding counter rotating pairs. If only one power unit is used and consequently all rotors rotate with the same revolutions per minute each rotor should either have variable rotational angle of the blades or swashplates or both for control of the rotor flight vehicle.

The invention claimed is:

1. A rotor flight vehicle comprising:
   a first rotor;
   a power unit;
   a transmission from the power unit to the first rotor, the transmission comprising a belt, a group of rotational axes that defines axes that axles are rotating around, wherein the axles comprise at least one power output axle connected to the power unit and a rotor axle connected to the first rotor, the belt being an endless belt having a length and a width, the belt being applied to both the power output axle and the rotor axle, the power output axle being concentric with a rotational axis being part of the group of rotational axes, and transmits power from the power output axle to the rotor axle, the rotor axle being concentric with a rotational axis being part of the group of rotational axes;
   wherein the power output axle and the rotor axle relate to each other such that the angle between the power output axle and the rotor axle is in the range of 80-100 degrees;
   wherein the belt has a torsion of 80-100 degrees, in the belt's transition between the power output axle and the rotor axle;
   wherein the power output axle comprises a first transmission pulley and a second transmission pulley, and the rotor axle comprises a rotor axle first transmission pulley and a rotor axle second transmission pulley, and wherein an axis of the rotor axle extends through the rotor axle first transmission pulley and the rotor axle second transmission pulley; and
   wherein the belt extends from the power output axle around the rotor axle first transmission pulley and runs back around the power output axle and back to the rotor axle second transmission pulley, before returning back to the power output axle, such that the rotor axle first transmission pulley and the rotor axle second transmission pulley rotates in the opposite direction and only the rotor axle first transmission pulley powers the rotation of the rotor axle.

2. The rotor flight vehicle of claim 1, wherein the belt runs around the power output axle and the rotor axle.

3. The rotor flight vehicle of claim 1, wherein the belt has a first side and a second side, wherein the belt is installed so the belt always turns the same side towards the power output axle and the rotor axle.

4. The rotor flight vehicle of claim 1, wherein the power output axle and the rotor axle are not parallel with each other.

5. The rotor flight vehicle of claim 1, wherein the belt is a timing belt comprising teeth on a first side, and the first transmission pulley and the second transmission pulley comprise grooves for accommodating the teeth.

6. The rotor flight vehicle of claim 1, wherein the connection between the belt and the rotor axle comprises at least one one-way bearing, such that the belt can only power the first rotor in one direction.

7. The rotor flight vehicle of claim 6, wherein the at least one one-way bearing is a sprag clutch.

8. The rotor flight vehicle of claim 1, wherein the power unit comprises a combustion engine or an electric motor.

9. The rotor flight vehicle of claim 1, wherein the rotor flight vehicle comprises a second rotor and a second transmission powering the second rotor, wherein the second transmission comprises a second belt applied to the power output axle, the second rotor being applied to a second rotor axle that is arranged to rotate in the opposite direction of the rotor axle of the first rotor, the opposite rotation being achieved by adapting the path of the second belt such that the second belt is a mirror arrangement compared with the path of the belt of the first rotor to produce the opposite rotational direction of the rotor axle despite having the same rotational direction at the power output axle.

10. The rotor flight vehicle of claim 9, wherein the group of rotational axes of the transmission comprises three consecutive rotational axes.

11. The rotor flight vehicle of claim 9, wherein at least one of the first rotor and the second rotor have collective and/or cyclic pitch, wherein the at least one of the first rotor and the second rotor comprise a swashplate for controlling blades of the rotor, where in the control of the swashplate is achieved by a group of power means being at least three power means connected to the swashplate.

12. The rotor flight vehicle of claim 11, wherein the rotor flight vehicle has redundant transmissions to each rotor, by a second transmission extending from the power output axle to the rotor axle, comprising a second belt.

13. The rotor flight vehicle of claim 9, wherein the rotor flight vehicle comprises at least three rotors, and wherein each rotor has its own transmission.

14. The rotor flight vehicle of claim 13, wherein the same power unit powers all rotors of the rotor flight vehicle.

15. The rotor flight vehicle of claim 14, wherein the rotor flight vehicle comprises a further redundant power unit that operates in parallel by transmitting power to the same drive axle as the first power unit for redundantly powering the rotor flight vehicle.

16. The rotor flight vehicle of claim 1, wherein the rotor flight vehicle is a drone.

17. The rotor flight vehicle of claim 1, wherein the rotor axle first transmission pulley has a one-way bearing attachment, and the rotor axle second transmission pulley has a two way rotational bearing attachment to the rotor axle.

18. The rotor flight vehicle of claim 17, wherein the belt extends from the power output axle around the first transmission pulley and runs back around the power output axle and back to the second transmission pulley, before returning back to the power output axle, such that the first transmission pulley and the second transmission pulley rotates in the opposite direction and the respective transmission pulleys each powers a dedicated rotor axle that are coaxial and counter rotating, wherein there are two one-way bearings either as attachment for the respective transmission pulleys to the rotor axles and/or at the transmission pulleys to the power output axle.

19. The rotor flight vehicle of claim 1, wherein the axis of the rotor axle extends through a center portion of the first transmission pulley and the second transmission pulley.

20. The rotor flight vehicle of claim 1, wherein the transmission is configured to provide rotational power to the first rotor to provide a lift force to the rotor flight vehicle.

* * * * *